No. 698,563.  
W. G. SCOTT.  
CULTIVATOR.  
(Application filed Oct. 14, 1901.)  
Patented Apr. 29, 1902.

(No Model.)  
2 Sheets—Sheet 1.

Witnesses:  
E. Behel  
Jas. J. Cox

Inventor  
William G. Scott  
By A. O. Behel  
Atty

THE NORRIS PETERS CO., PHOTO-LITHO., WASHINGTON, D. C.

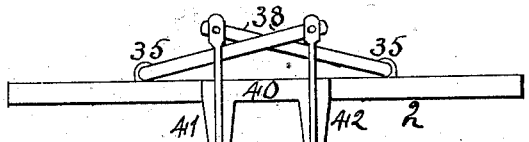
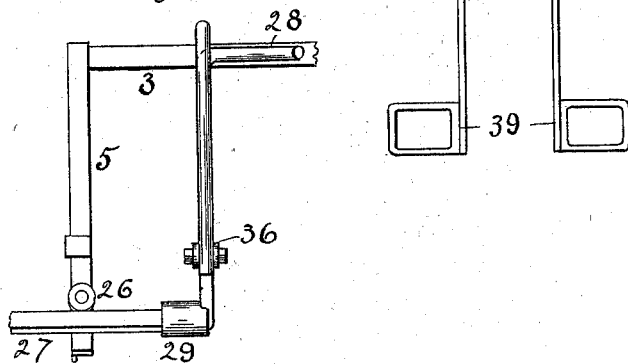
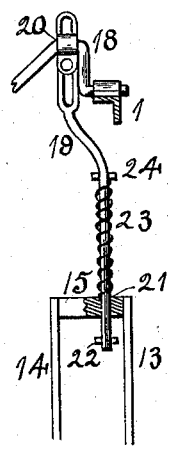
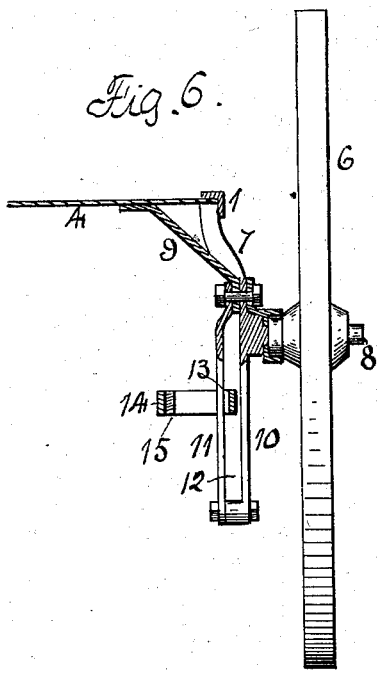
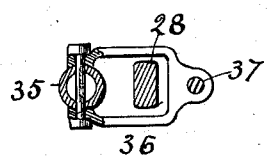

UNITED STATES PATENT OFFICE.

WILLIAM G. SCOTT, OF ROCKDELL, MINNESOTA.

CULTIVATOR.

SPECIFICATION forming part of Letters Patent No. 698,563, dated April 29, 1902.

Application filed October 14, 1901. Serial No. 78,590. (No model.)

*To all whom it may concern:*

Be it known that I, WILLIAM G. SCOTT, a citizen of the United States, residing at Rockdell, in the county of Olmsted and State of Minnesota, have invented certain new and useful Improvements in Cultivators, of which the following is a specification.

This invention relates to improvements in cultivators; and it consists in the details set forth in the specification and pointed out in the claims.

Figure 1:
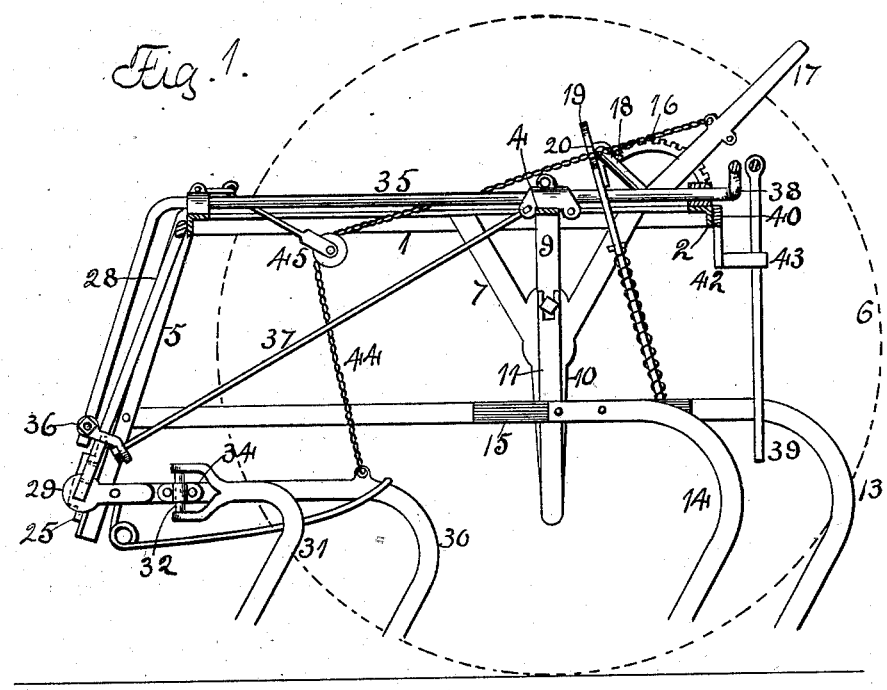
Figure 2:
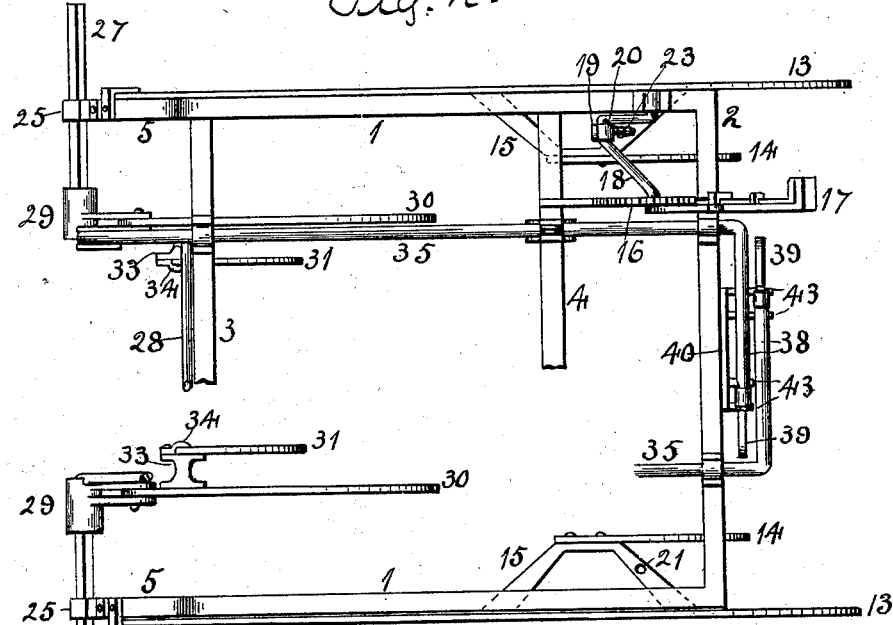

In the accompanying drawings, Figure 1 is a central lengthwise vertical section. Fig. 2 is a plan view. Fig. 3 is a front elevation. Fig. 4 is a rear elevation. Fig. 5 is a rear elevation of the lifting-lever and its connection with the outside drag-bar. Fig. 6 is a transverse section of the axle and the guide for the outside drag-bars. Fig. 7 is a plan view of the connection between the foot-lever and sliding yoke.

The cultivator in the main is substantially the same as shown and described in Letters Patent granted to me May 1, 1900, No. 648,443, for improvements in cultivators, and is illustrated in this application to show the relation of my improvements thereto.

The main frame consists of the side bars 1, rear cross-bar 2, front cross-bar 3, and central cross-bar 4. The side bars have forward extensions 5. Wheels 6 support the main frame, and brackets 7 have a connection with the main frame and have an axle 8, receiving the wheels. A brace-bar 9 has a connection with the main frame. The bracket 7 has an extension 10, and a bar 11, secured to the lower end of the extension, has its upper end connected to the bracket, thereby forming a loop 12.

Outside drag-bars, consisting of the two bars 13 and 14, have their rear ends turned down to form shovel-standards, and the forward end of the bar 14 is connected to the bar 13 by the bracket 15. The bar 13 has a pivotal connection with the extension 5 of the side bars of the main frame. The bar 13 is located within the loop 12, so that the drag-bars have a vertical movement, but are held against lateral movement. A toothed segment 16 is supported by the main frame, and a hand-lever 17 is pivotally supported by the main frame and has a spring-catch operated by a thumb-lever for forming a connection with the toothed segment. This hand-lever has a crank portion 18, to which is connected an arm 19 by an adjustable cap 20. This arm extends through an opening 21 in the bracket 15, and a pin 22 passes through the arm, thereby limiting the downward movement of the drag-bar. A coiled spring 23 surrounds the arm 19, one end resting upon the bracket 15 and the other end against the pin 24. The shovels of this drag-bar can be forced into the ground by the hand-lever and through the coiled spring 23. The cap 20, having an adjustable connection with the upper end of the bar 19, forms the means for varying the tension of the spring.

To the lower ends of the extensions 5 are secured loops 25, and within the loops are located rollers 26. A yoke comprising the two horizontal portions 27 and arch portion 28 is guided in the loops 25 underneath the rollers. To the horizontal portions of the yoke are secured brackets 29, to which are pivotally connected the inner drag-bars, comprising the bars 30 and 31, having their rear ends turned down, forming shovel-standards. The forward end of the bar 31 supports a vertical rod 32, having an adjustable connection with the bracket 33 by the cap 34, clamped in connection therewith. The bracket 33 is supported by the bar 30.

The foot-levers 35 are pivotally secured to the main frame, having their forward ends turned down and supporting a loop 36, to the rear end of which is secured a brace-rod 37, having its rear end connected to the main frame. The loop 36 surrounds the vertical arm of the arch portion of the yoke, so that a connection is formed between the two forward sets of drag-bars and the foot-levers. The rear ends of the foot-levers have extensions 38 extending at right angles to the main portion, and to their free ends are fitted foot-stirrups 39, hanging in a vertical position.

To the rear face of the rear bar 2 of the main frame is secured a bar 40, from which depend sections 41 and [42, and from each section extend projections 43, between which the vertical portions of the stirrups are located, which allow only a limited lateral movement to the stirrups. A chain 44 has a connection with the bar 30 of the forward drag-bar and passes over a pulley 45, supported by the main frame, having its other end connected to the hand-lever, by means of which the drag-bar can be raised and held elevated. By means of these stirrups the foot-levers can be oscillated, which will impart a reciprocating movement to the yoke and cause the forward drag-bars to move laterally of the cultivator, always presenting the same surface of the shovels to the ground.

I claim as my invention—

1. In a cultivator, the combination of a main frame, a drag-bar capable of a vertical movement only and a stationary loop extending from the main frame, the drag-bar guided in the loop.

2. In a cultivator, the combination of a main frame, a drag-bar, a lifting-lever having a crank portion, a rod having a connection with the drag-bar, the upper end of the rod having a lengthwise slot and a cap embracing the crank portion and adjustably connected with the slotted portion of the rod.

3. In a cultivator, the combination of a main frame, two loops supported by the main frame, a yoke having its horizontal portions guided in the loops and a roller located over each horizontal portion of the yoke.

4. In a cultivator, the combination of a main frame, front drag-bars capable of a bodily movement transverse of the cultivator, foot-levers for raising the drag-bars and guides for the foot-levers preventing lateral movement of the foot-levers.

WILLIAM G. SCOTT.

Witnesses:
BURT W. EATON,
AMELIA R. WINTER.